2 Sheets—Sheet 1.
T. J. CHUBB.
MAKING STEEL DIRECT FROM THE ORE.
No. 79,314.   Patented June 30, 1868.
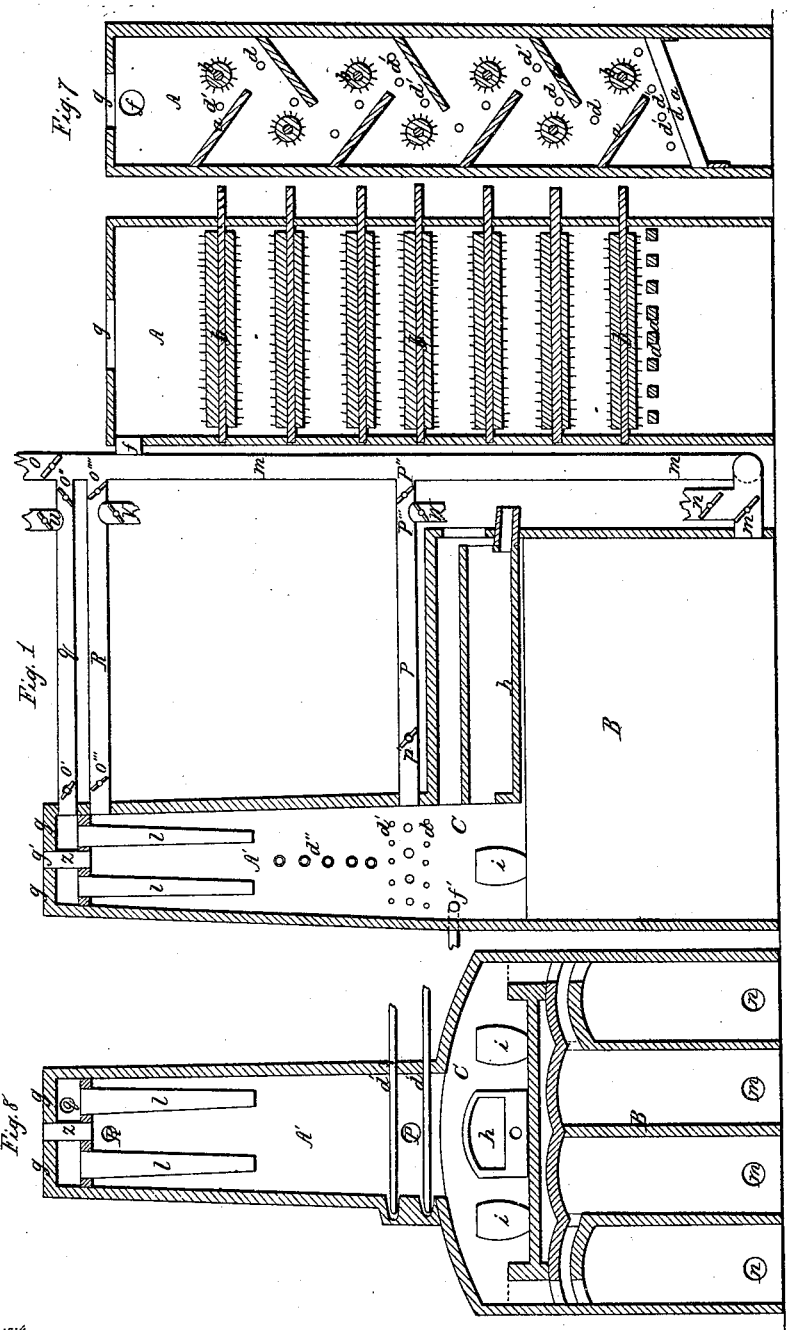

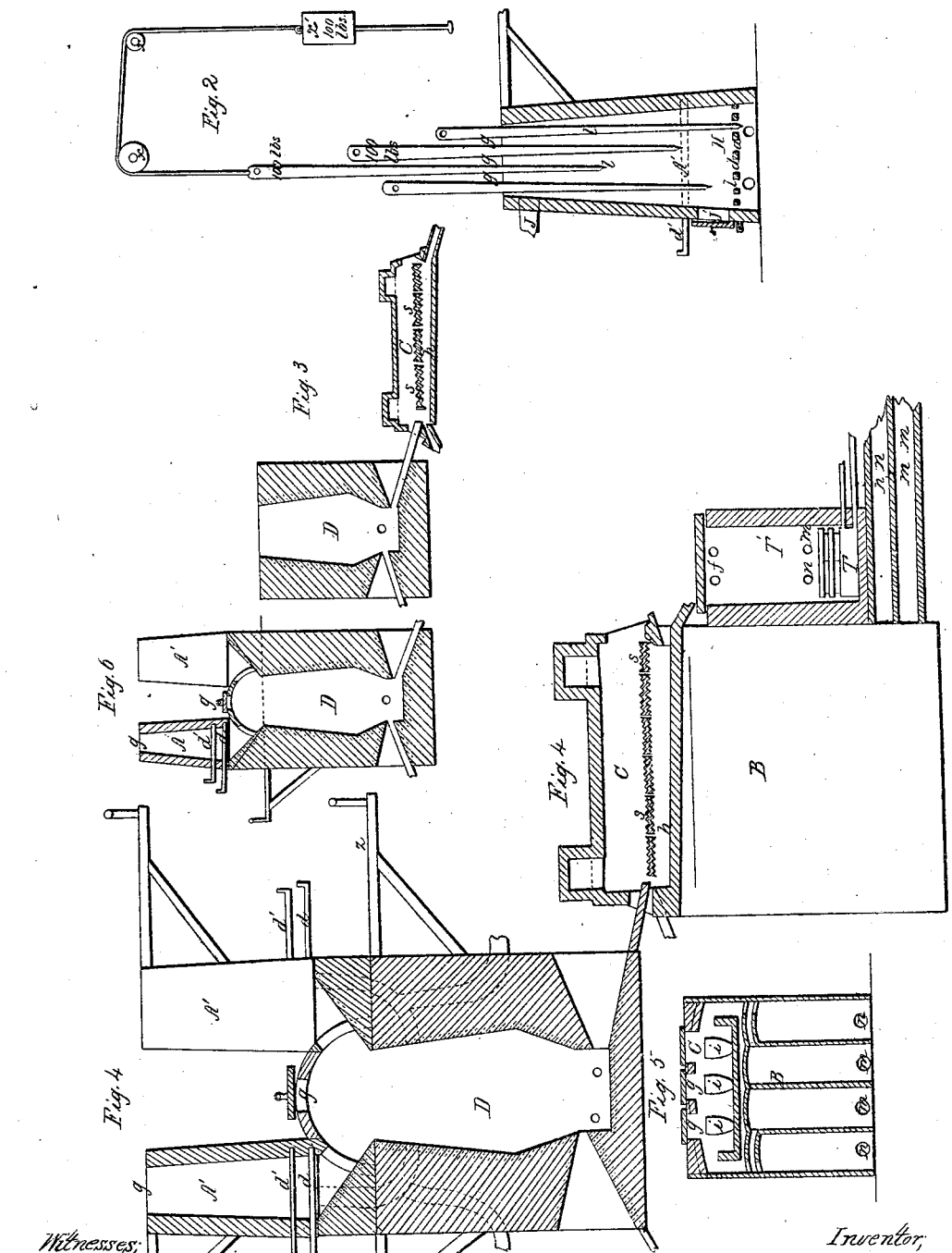

UNITED STATES PATENT OFFICE.

THOMAS J. CHUBB, OF WILLIAMSBURG, NEW YORK.

IMPROVEMENT IN MAKING STEEL DIRECT FROM THE ORE.

Specification forming part of Letters Patent No. 79,314, dated June 30, 1868; antedated January 15, 1868.

*To all whom it may concern:*

Be it known that I, THOMAS J. CHUBB, of Williamsburg, Kings county, State of New York, have invented certain new and useful Improvements in Process and Furnaces for Decomposing Mineral Substances and Making Steel Direct from the Ore; and I do hereby declare that the following is a full, clear, and exact description thereof, reference being had to the accompanying drawings, and to the letters of reference marked thereon, in which—

Figure 1 is a sectional elevation of the gas-generator A, the deoxidizing-chamber A', the melting-chamber C, arranged above a gas-regenerative apparatus or heat-reclaiming apparatus B. Fig. 2 is a deoxidizing and carbonizing chamber. Fig. 3 is a cupola and refining-furnace combined. Fig. 4 is a deoxidizing-chamber, a cupola, a blast-furnace, a refining-chamber, a gas-regenerative apparatus, and a mold-chamber combined. Fig. 5 is a gas-regenerative apparatus and a melting and refining chamber combined. Fig. 6 is a deoxidizing-chamber and a cupola blast-furnace combined. Fig. 7 is a transverse section through the gas-generator A in Fig. 1. Fig. 8 is a transverse section through the deoxidizing and carbonizing chamber A' in Fig. 1, and through the melting-chamber C and through the heat-accumulator B.

Similar letters of reference indicate corresponding parts in all the figures.

A is a gas-generative chamber. A' is a deoxidizing and carbonizing chamber. B is a gas-regenerative furnace or a gas and air heating apparatus. C is a melting and refining chamber. *a* are fuel-supporters in the gas-generators. *b* are stirrers and conveyers in the same. *d d d a d'* are supports or grate-bars. *g g* are openings or feeding-holes. *h* is a retort. *i i* are crucibles. *j* is an opening for waste gases. *l l* are air-flues, openings, or tubes. *m m* are gas-flues, connecting the gas-generator with the gas and air heating apparatus. *n n* are air-passages leading to the air and gas-heating apparatus. *d''* are inspecting-holes. S S are skimmers in the refining-furnace. T is an agitator in hot-mold chamber T'. D is a cupola or blast-furnace.

My invention and improvements consist in the arrangement, in a gas-generating furnace or apparatus for decomposing coal, or carbonaceous, mineral, or metallic substances, of a series of shelves, supports, stirrers, or conveyers, by which granulated or finely-disintegrated substances may be kept in an open, porous, disintegrated condition, so as to give vent or a free passage or passages to heated air or carbonaceous gas or gases among and through the said substances, for the purpose of decomposing and chemically changing the condition of the same.

Also, in the arrangement of a melting-chamber, or a chamber of combustion, wherein heated air and reheated gas arising from a heat-reclaiming apparatus, and employed for converting and melting steel, or converting and melting iron, or iron ore, or iron or steel sponge into steel, in combination with a gas-generator, a gas-reheating and an air-heating apparatus or furnace.

Also, the process of making cast-steel in vessels arranged in the above-described chamber and heated, converted, or melted by the combustion of highly-heated air and reheated gas arising from a heat-reclaiming apparatus or furnace.

Also, in the arrangement of a stationary melting chamber or furnace for making cast-steel, or wherein steel is converted or melted, or iron or iron ore, or iron or steel sponge is converted or melted into cast-steel previous to tapping and running the same into molds, in combination with the process of desulphurizing, deoxidizing, and carbonizing iron ore in retorts or closed vessels in contact with carbon or carbonaceous substances, gas, or gases.

Also, in the process of decomposing ores or metals or metallic substances by passing a current or currents of heated gas or gases among and through the granulated or disintegrated substances, for the purpose of assisting the decomposition and converting the metal directly into cast-steel, decomposing, deoxidizing, and carbonizing the iron by said vapors, gas, or gases arising from heated rock-oil, coal, or coal-tar, petroleum, peat, tan, or other carbonaceous matter.

To enable others skilled in the art to make, use, and employ my improvements and invention, I will proceed to describe the construction and operation thereof.

I construct, for decomposing dust-coal, a high brick chamber, A, with usual grate-bars $d$ at the bottom, and a series of shelves, $a\ a$, conveyers or stirrers $b$, which are made to revolve, so as to break up any clogging lumps that may form and regulate the descent of the fuel at the option of the operator. The fuel is fed in at the top at opening $g$, and the conveyers turned so as to cause a portion of the fuel to descend onto the lower grate-bars $d$. A fire is kindled thereon, and the carbonic-acid gas arising from the burning fuel on the lower grate-bars $d$ ascends through, between, and around the suspended fuel on its way to the outlet-passage $f$. The heated gases, coming in contact with the suspended fuel, decompose it, freeing the carbonaceous gas or gases. They combine with the carbonic-acid gas, and produce a rich carbonic-oxide gas, or a gas or gases of such a combustible nature that when reheated and brought in contact with heated atmospheric air, an intense heat is produced.

By the employment of the supporters $a$, I am enabled to burn fine dust-coal in a thin layer on the lower grate-bars, and pass the heat through a large quantity of the same material above it without clogging or choking up the air or gas passages through the same, which would be the case if all the fuel, being decomposed at the one time, were resting on the one set of grate-bars, or, the fuel burning thereon, the fire thereof would be extinguished from the want of air-passages through the same.

These supports and conveyers may be made of cast-iron, or any suitable material, the heat not being so great as to destroy cast-iron very soon. Fine dust anthracite or bituminous coal may be used. I prefer to mix those two kinds of coal before using; or any kind of fine dust or granulated fuel may be used in like manner.

For the decomposition of iron ores similar arrangements may be employed, dispensing with the lower grate-bars, and allowing the heat from the interior of the melting-chamber to pass up through the chamber $A'$.

To make cast-steel direct from the ore by the aid of the above-described apparatus, I mix the fine pulverized ore with fine pulverized coal or other carbonaceous matter, and I place the brick chamber $A'$ above the melting-chamber C, or above the melting-chamber better shown and described in my other application, filed in the Patent Office about the 26th day of December, 1867, and I feed the mixed substances in at the top openings $g\ g$, and discharge at the lower end directly into the melting-chamber. The ore thereby will become deoxidized and carbonized, and when deposited on the floor of the melting-chamber, or submerged in the molten metal therein, will be melted, and may be tapped and run into molds in the usual way. The gases arising from the mixed ore and fuel may be reheated and burned in the combustion or melting chamber C, and the waste heat therefrom conducted to the heat-reclaiming apparatus B, if desired.

By this arrangement any carbonaceous matter may be mixed with the ore or applied in the melting-chamber through pipe $f'$, such as coal-tar, oil, or petroleum, and there converted into gas and caused to flow through the suspended ore, and thereby assist the decomposition of the ore and carbonization of the iron, and the waste gases therefrom burned to produce the heat required for their decomposition.

In making cast-steel by the aid of the intense heat produced by a heat-reclaiming apparatus, I arrange a combustion-chamber, C, directly over the heat-reclaimer B, and place therein the retorts $h$ or crucibles $i\ i$, containing the substances intended to be converted or melted into cast-steel, and when converted or melted, I pour into the mold as usual. I am enabled, by the employment of this apparatus for this purpose, to use clay retorts or clay crucibles in place of the usual black-lead or plumbago crucibles usually employed for that purpose; and also I am enabled to make or melt the steel in less time and with less fuel. Therefore, by the application of a heat-reclaimer, in combination with the process of making cast-steel, I greatly reduce the expense and cost of the same.

The process of converting iron ores directly into steel has been practiced heretofore by numerous persons. Several of the modes of decomposing or deoxidizing and carbonizing the ore, and melting the same in the usual old-style portable crucibles $i$, may be found described in the patent of Samuel Lucas, English Patent No. 1,869, dated April 18, May 12 and 14, 1792, wherein iron ore was deoxidized and carbonized in closed vessels, in contact with carbon or charcoal, in strata or layers of ore and layers of coal; also, in the English Patent of John Isaac Hawkins, No. 7,142, dated July 4, 1836, and sealed January 4, 1837; also in the American patent of George Hand Smith, No. 11,338, dated July 18, 1854, Reissues No. 2,333 and No. 2,334, and other similar patents, wherein the process of decomposing or deoxidizing iron ore has been described.

By combining or mixing the ore with charcoal, to obtain carbon, and with horn and hoofs, leather shavings, animal charcoal, and other azotized compounds, to obtain cyanogen, or from which both nitrogen and carbon are obtained, and many other described ingredients, essential in converting iron or iron ore into steel, such as saltpeter, cyanides of sodium, or of potassium, or of calcium, or of iron, or of manganese, or the ferro-cyanides, or farridcyanodes of these; also, of alkaline matter, such as carbonate of soda or potash, the crude cast-iron known as "spiegeleisen," and the American iron known as "Franklinite," or the ores thereof, may be more or less advantageously employed, or a small current of atmospheric air, just sufficient to produce an atmosphere of nitrogen and carbonic-oxide gases in the converting or cementation process, will greatly assist the operation; or steam or any substance that will yield hydrogen to combine with the sulphur and phosphorus, may be used.

Another of my improvements upon the process, or the various processes, of decomposing ore, or of deoxidizing, carbonizing, and converting the ore into cast-steel, is the arrangement and combination of a stationary melting chamber or furnace, for melting the decomposed and carbonized ore in a large way, (and dispensing with the use of the expensive plumbago crucible or small portable vessel,) with the process or processes of deoxidizing iron ore, and carbonizing the metallic particles, which I effect, as hereinbefore described, and also described in the above-named patents, and in my previous patents, and will be hereinafter referred to.

Another of my improvements is the mixing a portion of the fuel or carbon, and other substances favorable for or to deoxidize and carbonize with the ore, and passing a current of highly-heated carbonic oxide and nitrogen gases, or carbonic-oxide gas alone, or carbureted hydrogen, carbonic oxide, and nitrogen gases, through and among the finely-divided particles of the mixed ore, for the purpose of deoxidizing and carbonizing the metallic particles, and afterward using or burning those gases for melting the ore sponge or metallic particles, and further using the waste heat from such purpose for heating the air that supports its combustion, and heating or reheating the carbonic oxide that assists the decomposition or deoxidization and carbonizing of the ore.

By this combined improvement of husbanding, regenerating, reclaiming, and reusing the heat, the very purest, although most expensive, fuel—such as charcoal, petroleum, and rosin—may be used at less cost for fuel than in the ordinary way, and producing a superior metal thereby, or the very cheapest fuel, such as dust-coal, may be used for a less superior metal.

Another modification of the arrangement of a deoxidizing and carbonizing chamber is to place a hollow chamber, A', Fig. 2, with a perforated bottom, H, a portable cover, and an opening, J, near the top, for the escape of gases. The holes in the bottom are of equal distance apart, of about, say, two inches diameter and four inches apart, arranged diagonally. I place round poles $l\ l$ or round iron rods or pipes in those holes in the bottom of sufficient length to reach to the top of the chamber. I then fill in the fine mixed iron ore, carbon, and other substances up to near the opening J, packing the substances tightly as they are filled in. I then pull out the poles, pipes, or rods, place on the cover, and hermetically seal it with clay or other substances, and apply the heated gas or gases up through the holes in the bottom and that extend up through the whole mass of the ore to the top thereof.

I am enabled by this arrangement to bring the heated gas or gases in immediate contact with the ore surrounding the small holes extending up through the same, and in proximity to the whole mass of the ore in the chamber, and giving at the same time vent-holes for the escape of waste gases.

Another modification of this last-named arrangement is shown in Figs. 1, 2, and 3, in which A' is the hollow chamber, made wider at the bottom than at the top. The pipes $l\ l$ are tapering—smaller at the bottom than at the top. The ore is fed in at openings $g\ g$. The gases enter at and through the bars $d$ and $d'$. These bars may be taken out or inserted at pleasure, to discharge the carbonized ore and other substances either into crucibles or retorts, and the gas or gases that pass up through the ore may come from the retort $h$, or from a gas-generator, or from a gas-regenerative furnace or apparatus, B. The ore in this arrangement is or may be mixed with sawdust, coal-tar, coal, or other substances. During the descent of the ore it becomes coagulated or adheres together, and shrinks in bulk so as to leave the holes up through it, and so as not to touch the pipes $l\ l$ or the sides of the furnace, it being supported by the bars $d'$. To discharge a given portion of the ore the bars $d$ are inserted, and the bars $d'$ removed, when the whole mass descends onto the bars $d'$. Then the bars $d'$ are driven in and the bars $d$ removed, when the ore and substances between bars $d$ and $d'$ fall into the crucible or retorts or other vessel below. This arrangement may also be used for decomposing the fuel.

It is not essential, although it is desirable, that for decomposing and carbonizing iron ore the carbonizing-chamber should be over the melting-chamber. Nor is it essential that any cover should be used, or that the tapering rods or pipes should be wholly or partially removed. The tapering tubes or rods may be suspended from above, and raised and lowered, at the pleasure of the operator, for the purpose of opening or keeping open the vent-holes. Nor is it essential that the melting-chamber or the refining-chamber should be heated by a regenerative-gas furnace, or an air and gas heating apparatus, as other modes of heating may be employed.

The tapering rods or tubes may be suspended over the ordinary cupola or blast-furnace, and raised and lowered to make and open vent-holes through the ore, and the metallic particles thereof melted therein, and the molten metal run into the refining-chamber or into molds.

The cold air, or the heated air, or the heated gas or the reheated gas or gases from the gas-generative or regenerative apparatus, may be forced through the ore in the carbonizing-chamber, or through the ore in the cupola or blast-furnace, or through or over the ore or the metallic particles, or over the molten metal, at the option of the operator.

Another modification of this invention is shown in Fig. 4, and also in part shown in my specification and drawing of my application, filed December 26, 1867. My melting and refining-chamber may, with some modifications, be applied to or operated in connection with the ordinary cupola or blast furnace, receiving the molten metal therefrom, reheating and refining the same in my refining chamber or furnace.

Another modification of this invention is shown in Figs. 4 and 6, arranged for working ores, such as the magnetic oxides and titanic ore, which hold their oxygen with so much tenacity that they cannot advantageously be reduced in the ordinary blast-furnace. The deoxidizing and carbonizing chamber is arranged above the ordinary cupola or blast furnace D. The deoxidized ore is fed into the blast-chamber direct from the deoxidizing-chamber, or fed in the usual way. Such ores may be thus easily and perfectly reduced, and the molten metal tapped and run into the usual pig or molds, or may run into the refining-furnace C h.

The heat for the deoxidizing-chamber may be derived from the waste heat from the blast-furnace, or from any other source. The deoxidizing and carbonizing chamber may be located over or nearly over the cupola or blast-furnace, or in any convenient locality, and the carbonized ore transmitted to the cupola in any convenient manner.

I do not confine my improvements to any particular mechanical arrangement, nor to the employment of any particular construction of a heat-reclaiming apparatus or gas-regenerative furnace, so long as the principle of heating the air and the gas, or reheating the gas previous to combustion, is employed, nor to any particular process of deoxidizing iron ore and carbonizing the metallic particles and converting the same into cast-steel.

What I claim as my invention and improvements is—

1. The arrangement and employment of fuel-supporters $a\ a$ and $d\ d'\ a$, for the purpose set forth.

2. The arrangement and employment of stirrers and conveyers $b\ b\ b$, for the purpose set forth.

3. The process of decomposing mineral substances by currents of heated gas or gases passing through and among finely-divided particles of the same, substantially as described and herein shown, and for the purpose set forth.

4. The carbonization of iron or iron sponge, or the metallic particles therein, by a current or currents of heated gas or gases, as herein described, passing through and among finely-divided particles of the same, substantially as described.

5. The steel-melting chamber C, in combination with a heat-reclaiming apparatus or a gas-regenerative, or an air and gas-heating, apparatus or furnace.

6. The process of making cast-steel, in combination with a heat-reclaiming and regenerative apparatus or furnace.

7. The employment of aluminous substances, such as fire-clay crucibles, as a substitute for plumbago crucibles, for making or melting steel therein, in combination with a gas-generative furnace and a heat-reclaiming apparatus.

8. The employment of a stationary melting chamber, vessel, or furnace, in combination with the appurtenances employed in the process of decomposing or deoxidizing iron ore and carbonizing the metallic particles thereof.

9. The employment of a stationary melting chamber, vessel, or furnace, in combination with the process or processes of decomposing or deoxidizing iron ore and carbonizing the metallic particles thereof.

10. The process herein described of decomposing or deoxidizing iron ore and carbonizing the metallic particles thereof.

11. The process herein described of making cast-steel direct from the ore.

12. The employment of coal-tar, rosin, petroleum-oil, or the gas or gases thereof, for the purpose set forth.

13. The employment in the deoxidizing-chamber, in combination with carbon, of ammonia or some ammoniacal compound, or of fusible compounds of cyanogen, or the gas or gases therefrom, to facilitate the conversion of iron ore or iron or steel sponges into molten or cast steel, substantially as described.

14. The employment of the chamber A A' in the manner described, and the appurtenances and process employed therewith, for the purpose set forth.

15. Deoxidizing and carbonizing iron ores in a chamber separate from and previous to melting the same in a cupola or a blast-furnace, substantially as described.

16. The combination of the process or processes of deoxidizing and carbonizing iron ores with the process of reducing and melting the metallic particles thereof in a cupola or a blast-furnace.

17. The arrangement of a melting or remelting and refining chamber, as described, in combination with a cupola or a blast-furnace, Figs. 3 and 4.

18. The combination of the process of reducing iron ores and melting the metallic particles thereof in a cupola or a blast-furnace, with the process of melting or remelting and refining, substantially such as herein described.

19. Producing refined iron or steel by the process of deoxidizing and carbonizing the ore in a separate chamber, and melting the metallic particles thereof in a cupola or a blast-furnace, substantially as described and shown, Figs. 4 and 6.

20. Producing refined iron or steel by the process of reducing the ore and melting the metallic particles thereof in a cupola or a blast-furnace, and reheating and refining the same in a melting or remelting and refining chamber, substantially such as is herein described.

21. The arrangement or employment of an air-heating and a gas heating or reheating apparatus, in combination with a cupola or blast-furnace, for the purpose set forth.

22. The arrangement or employment of an air-heating and a gas heating or reheating apparatus in the process or processes of deoxidizing and carbonizing iron ore, substantially as described.

23. The employment of the chamber C in the manner described, and the appurtenances and processes employed therewith, for the purpose set forth.

THOS. J. CHUBB.

Witnesses:
SIDNEY OAKSMITH,
THOMAS MOSS.